Feb. 23, 1937.  A. R. THOMPSON  2,071,667
PEACH SPLITTER
Filed Feb. 16, 1935  3 Sheets-Sheet 2
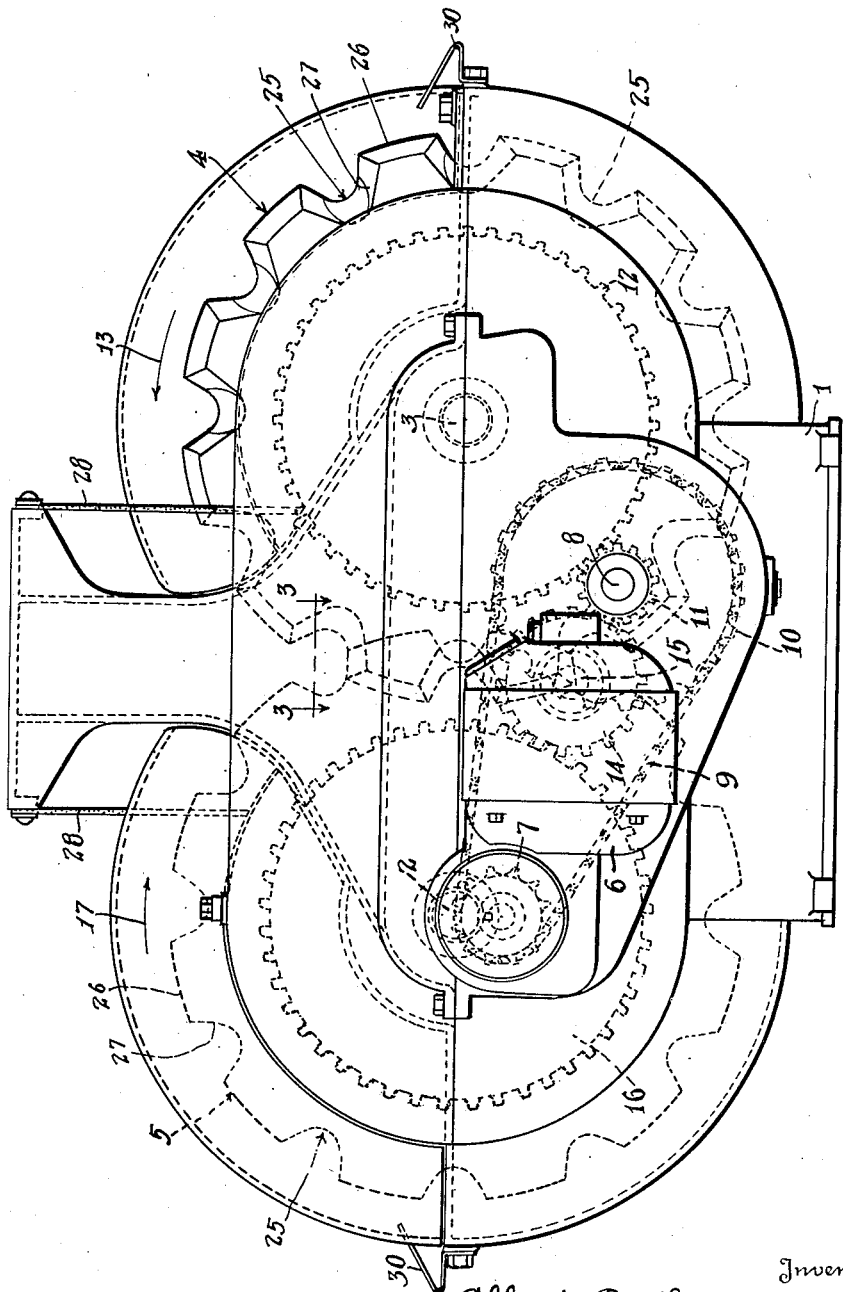
Inventor
Albert R. Thompson
By Lyon & Lyon
Attorneys Feb. 23, 1937.  A. R. THOMPSON  2,071,667
PEACH SPLITTER
Filed Feb. 16, 1935  3 Sheets-Sheet 3
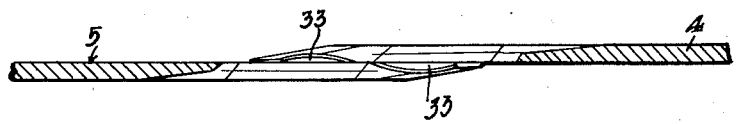
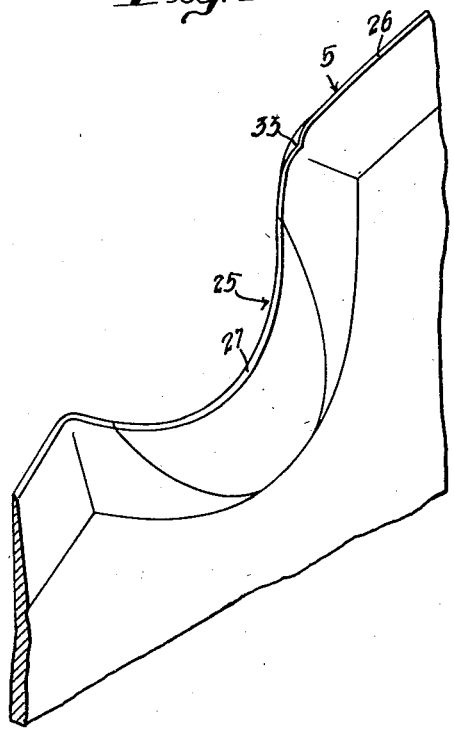
INVENTOR.
Albert R. Thompson
BY
ATTORNEYS Patented Feb. 23, 1937

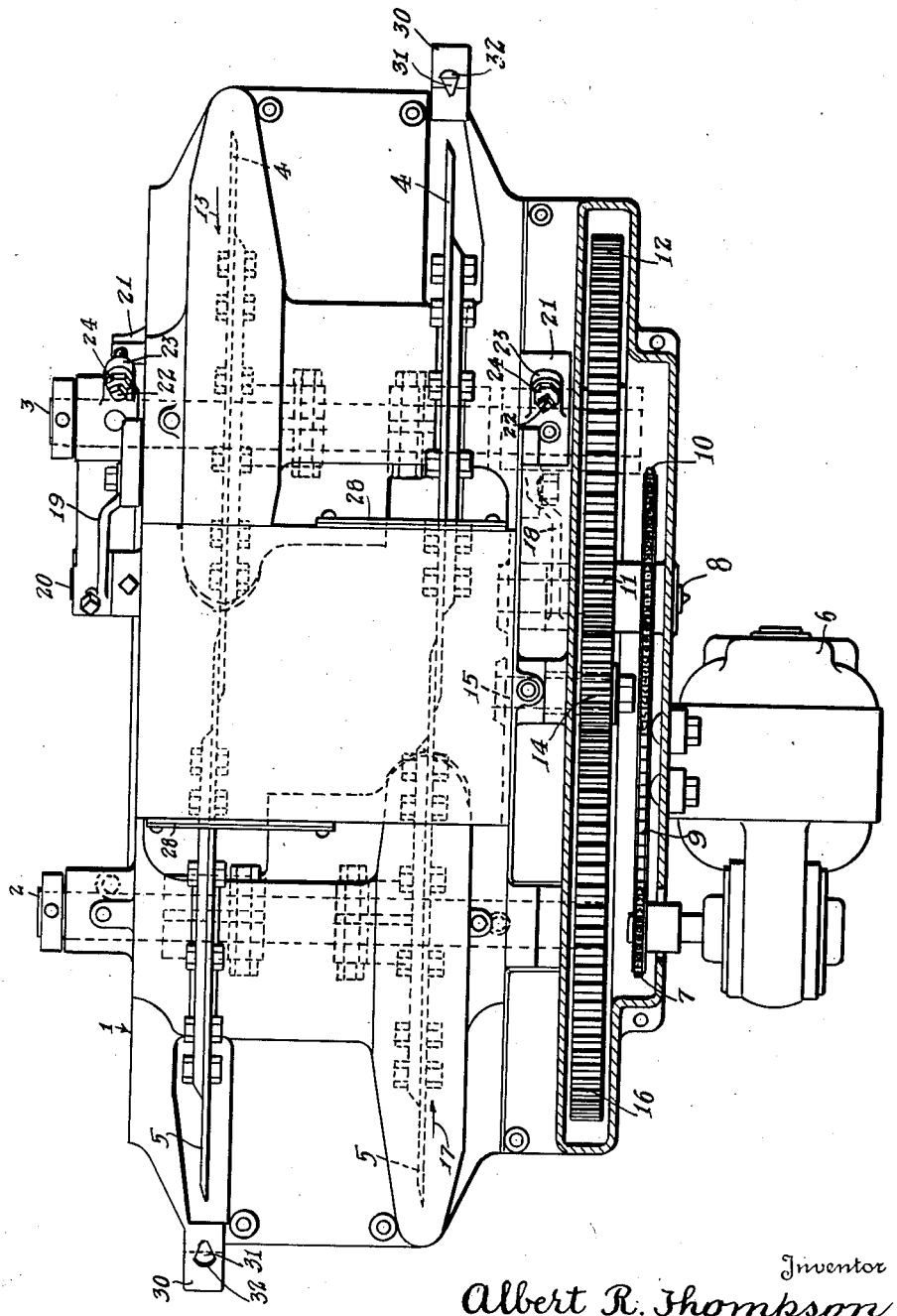

2,071,667

UNITED STATES PATENT OFFICE 2,071,667

PEACH SPLITTER

Albert R. Thompson, San Jose, Calif., assignor to Pacific Machinery Company, San Francisco, Calif., a corporation of California Application February 16, 1935, Serial No. 6,863

15 Claims. (Cl. 146—73)

This invention relates to peach splitters, and more particularly to a device for splitting peaches, particularly clingstone peaches, preparatory to pitting the halves of the fruit.

In preparing clingstone peaches for canning, drying, or for other processes, two separate, distinct methods are now in use employing machine pitting; one to which this application is related where the fruit is halved, including both the flesh of the fruit and the pit thereof in the plane of suture of the fruit, after which the fruit halves, including the halved pits or stones, are separately pitted. This method is particularly applicable where the percentage of split pits to impact pits runs high, although its use is not limited to such conditions.

This application is a substitute for, and continuation in part, of my pending application for Peach Splitter filed June 19, 1933, Serial No. 676,422.

An object of this invention is to provide a device which will split the pits of fruit without producing small fragments or particles of the pit of the fruit and which will operate effectively and rapidly to sever the flesh and the pits of the fruit in an economical and efficient manner.

Another object of this invention is to provide a fruit, and particularly a clingstone peach, splitter in which there is provided a pair of revolving discs which are revolved toward each other and are positioned in edge to edge overlapping relation, and in which there is provided a means for gripping and propelling the fruit as it is impaled upon one of the discs into the splitting position as the discs move toward each other.

Another object of this invention is to provide a means for splitting fruit such as clingstone peaches, in which there is provided means for completely severing or cutting the flesh of the fruit before the pit thereof is split, so that the halves of the fruit are cut apart and not torn apart.

Another object of this invention is to provide a means for splitting fruit in which the fruit flesh is completely severed into halves, and which means includes a pair of disc splitters which operate to cut into the pit of the fruit to split the pit into halves without requiring complete cutting through of the pit.

Another object of this invention is to provide a splitting device which includes a revolving disc and means providing a splitting edge which splitting disc is formed with a recess in its periphery to receive the pit of the fruit as it is impaled on the splitting disc so that the fruit is propelled into the splitting position with relation to the means providing the splitting edge by contact of the moving disc with the pit of the fruit.

Another object of this invention is to provide a peach splitter for splitting apart the halves of fruit, including the pits or stones thereof which is particularly applicable for use in the splitting of clingstone peaches, and which includes a pair of notched discs mounted to revolve toward each other in edge overlapping position in which the meeting notches of the discs are beveled or turned outwardly to prevent overlapping or hanging up of the discs during their revolution.

Other objects and advantages of this invention it is believed will be apparent from the following detailed description of a preferred embodiment thereof as illustrated in the accompanying drawings.

In the drawings:

Figure 1 is a top plan view of the peach splitter embodying my invention.

Figure 2 is a side elevation thereof.

Figure 3 is an enlarged fragmental edge elevation of a splitting disc embodying my invention taken substantially on the line 3—3 of Figure 2 illustrating the beveling of the blades to avoid overlapping.

Figure 4 is an enlarged fragmental view of one of the splitting discs embodied in my invention.

In the preferred embodiment of my invention as illustrated in the accompanying drawings, I indicates a base adapted to be mounted upon any suitable form of support such as a table or over a conveyer so that the fruit as split thereby may be delivered through the base I either into boxes or onto a conveyer as desired.

Mounted to rotate in bearings within the base I is a pair of spaced shafts 2 and 3. Secured to the spaced shafts 2 and 3 are splitting discs 4 and 5. A plurality of said splitting discs 4 may be mounted upon the shaft 3 if desired, and a corresponding plurality of splitting discs 5 are then mounted upon the shaft 2. The discs 4 and 5 are rigidly secured to the shafts 2 and 3 so as to rotate with the shafts 2 and 3. The shafts 2 and 3 are so positioned that the complementary splitting discs 4 and 5 overlap at their edges in shearing relation. Means are provided for rotating the shafts 2 and 3 in directions toward each other, which means may be of any suitable or desirable construction and are herein illustrated as including an electric motor 6 for driving the drive sprocket 7.

A countershaft 8 is journaled in bearings positioned within the base I and the countershaft 8 is driven from the sprockets 7 by means of a chain 9 which passes over a driven sprocket 10 mounted upon the countershaft 8. Mounted upon the countershaft 8 is a pinion 11 which meshes with a gear 12 secured to the shaft 3 so that the disc 4 is driven in the direction indicated by the arrow 13. The pinion 11 meshes with an idler sprocket 14 mounted to rotate upon a stub shaft 15 secured in position with reference to the base 1.

The idler sprocket 14 meshes with and drives the gear 16. The gear 16 is secured to the shaft 2 and drives the shaft 2 in a direction to cause the splitting disc 5 to rotate in the direction indicated by the arrow 17.

In order to provide for an adjustment of the degree of the edge overlapping of the discs 4 and 5 so that this edge overlapping may be adjusted to accommodate for fruit of different sizes or for fruit having pits of different size, one of the shafts, for example the shaft 3, is swingably supported with reference to the center of the countershaft 8 so that the shaft 3 may be rotated around this center and thus maintain at all times the gear 12 in proper mesh with the pinion 11. In order to accomplish this adjustment, shaft hangers 18 and 19 are provided. The shaft hanger 18 is journaled upon the countershaft 8. The shaft hanger 19 is journaled upon a stub shaft 20 which projects from the base 1 with its center in axial alignment with the center of the countershaft 8. Shaft hangers 18 and 19 carry bearings within which the shaft 3 revolves. Adjustment stops 21 are provided upon the base to engage the ends of the adjustment screws 22 carried by the shaft hangers 18 and 19, respectively. The adjustment screws 22 are threaded through lugs 23 formed integrally with the shaft hangers 18 and 19 and lock nuts 24 are provided for locking the screws in their adjusted position.

The discs 4 and 5 are preferably each of the same construction so that it will suffice to describe the construction of one of these discs, for example, disc 4.

The discs are formed with a plurality of pit receiving notches 25 formed inwardly from the periphery of the discs. The notches 25 are adapted to receive the pit of the fruit as the fruit is impaled upon the edge of the revolving discs. Each of the discs 4 and 5 is beveled to a sharpened edge 26 at its periphery and the bevel is in the direction away from the matching edges in the overlapping sides of the discs 4 and 5. The portions of the discs within the notches 25 is correspondingly beveled to provide for a cutting edge 27 within the notches 25, and as in the case where the edge 26 of the discs is sharpened by beveling away from the overlapping sides of the discs 4 and 5. Complementary notches 25 are formed in each of the discs 4 and 5 so that as the discs 4 and 5 are rotated toward each other, these notches come together at the point of overlap with the pit of the fruit confined between the two overlapping notches. As the fruit is impaled upon one of the discs 4 or 5 with its pit within a notch 25 and is moved thereby in a position with relation to the other notched disc, the entire flesh of the fruit is cut prior to the severing or splitting of the fruit pit.

The fruit pit is then partially cut and partially sheared into two halves by the action of the two sharpened edges 27 formed within the matching notches 25 of the two complementary discs, and after the shearing into two halves of the pit, the two halves of the fruit drop away from the shearing discs 4 and 5 through the base 1 into either a box or onto a conveyer, as desired.

With the machine as herein illustrated, two operators are intended to operate the machine, one operator for each pair of discs. In order to protect the operator from the pair of discs which he or she is not utilizing, guards 28 are provided which encircle and enclose the disc adjacent to the operator and which the operator is not utilizing.

In order to completely prepare the fruit for processing, it is sometimes desirable to remove from the fruit, particularly clingstone peaches, the tip end of the fruit prior to the splitting thereof. In order to permit the operator to remove this tip from the peaches prior to their splitting, tipping blades 30 are provided which tipping blades 30 are provided with apertures 31, including a sharpened tipping blade 32 so that the operator may insert the tipped end of the fruit into the aperture 31 and, by moving the same rearwardly over the blade 32, sever the tip from the fruit.

In order to prevent the discs 4 and 5 from overlapping or hanging up when the complementary notches 25 thereof are brought into matching position, I have found it advisable, as illustrated in Figure 3, to turn the advanced meeting portion of the discs within or adjacent the notches outwardly away from each other, as indicated at 33. In this manner as the notches are brought into matching relation by the rotation of the discs toward each other, any tendency of the discs to cross over or hang up at this instance is avoided by the curved or outwardly turned portions 33 of the disc edges. It will thus be noted that the advanced edge of the notch of each disc is turned outwardly as indicated at 33 from the edge of the other disc.

In the operation of these shearing discs as illustrated in Figure 4, I have found it advisable to provide within the notches 25 a hardened steel insert formed of such material as "stellite" or the like which is preferably formed by welding inserts of stellite in position so that the notches 25 are provided at their rear with sharpened hardened steel inserts over which the shearing of the pits of the fruit occurs.

Having fully described my invention, it is to be understood that I do not wish to be limited to the details herein set forth, but my invention is of the full scope of the appended claims.

I claim:

1. In a peach splitting device, the combination of a pair of discs having pit receiving notches in their peripheries, said discs being sharpened at their edges around said notches, means for rotatably supporting the discs with their edges overlapping and in shearing relation, the disc being so formed that a peach is adapted to be impaled upon one of said discs over one of said pit receiving notches, and means to rotate the discs to substantially completely sever the flesh of the peach and then the pit of the peach into halves as the peach is propelled by engagement of the pit in said notch.

2. In a peach splitting device, the combination of a pair of shearing discs mounted to revolve in shearing relation to each other, means for rotatably supporting the discs in edge overlapping position, complementary notches having their edges sharpened on the adjacent faces of the discs formed in the periphery of said discs and said sharpened edges of the notches lying substantially in the same plane as the edges of the discs, the notches being adapted to receive the pit of a peach impaled on the discs, means for rotating the discs in directions toward each other, the edge overlapping relation of the discs and complementary edge notches of the discs acting to completely sever the flesh of the peach prior to shearing the pit to complete the halving of the fruit upon the rotation of the discs.

3. An apparatus for splitting clingstone peaches, comprising a blade having pit receiving notches in its edges, a complementary blade mounted in edge overlapping shearing relation with said notched blade, the edges of the notch being sharpened and the sharpened edges of the notch lying substantially in the same plane as the overlapping of the discs, means for rotatably supporting the complementary blades in edge overlapping position and means for rotating the complementary blades toward each other to successively completely sever the flesh of a peach, and then severing the pit during continued shearing action of the said blades.

4. In a fruit splitting device, the combination of a pair of discs mounted in shearing relation, a pit receiving notch formed in one of said discs to receive the pit of a fruit as the fruit is impaled upon the disc, means for rotating the discs toward each other to move the fruit into shearing position between the discs so that the flesh of the fruit is completely cut prior to the shearing of the pit of the fruit, the meeting edges of the discs and notch being sharpened and lying substantially in the same plane so as to cause the pit of the fruit to be split without cutting through the pit.

5. In a clingstone peach splitting device, a pair of complementary rotating discs arranged in edge overlapping relation, complementary notches formed in the edge of the discs of arcuate formation approximating the cross-sectional contour of a peach pit, the edges of the notches being sharpened and overlapping in substantially the plane of the edges of the discs to substantially completely sever the flesh of the fruit prior to the splitting of the peach pit, means for rotatably supporting the complementary discs in edge overlapping shearing relation, and means to rotate the discs in timed relation to carry the peach into splitting position.

6. In a clingstone peach splitting machine, the combination of a pair of overlapping complementary rotatable discs sharpened at their edges and having formed at their periphery complementary notches, means for rotatably supporting the complementary discs, the axes of rotation of the discs being disposed substantially on a horizontal plane, said notches providing impaling spaces into which the pit of the fruit may be passed in predetermined position by the operator simultaneously on each side of the machine, means for rotating the discs toward each other, and the complementary notches being sharpened for a portion of their extent in substantially the same plane as the sharpened edges of the discs.

7. In a clingstone peach splitting machine, the combination of a pair of complementary rotatable discs sharpened at their edges and having formed in their periphery complementary notches into which the pit of the fruit is adapted to be passed as the fruit is impaled upon the edge of the discs in predetermined position, the notches being sharpened at their edges toward the adjacent faces of the discs, the sharpened edges of the notches lying in substantially the same plane as do the sharpened edges of the discs, and the discs being positioned to overlap so as to move the sharpened edges of the notches into overlapping relation, means for rotatably mounting the discs in edge overlapping shearing relation, and means for rotating the discs so that the peaches as impaled thereon are carried into position so that the flesh of the fruit is substantially severed, and then the pit of the fruit is split.

8. In a peach splitting machine, the combination of a pair of complementary rotatable discs, said discs being sharpened at their edges and having pit receiving complementary notches formed in their periphery, the notches having sharpened edges lying substantially in the plane of the sharpened edges of the discs, means for rotatably mounting the discs in edge overlapping shearing relation, means to drive the discs in timed relation, and an edge of the disc being exposed to an operator whereby peaches may be impaled directly thereon in predetermined position with the pit of the peach in the notch of one disc, and the rotation of this disc acting to carry the impaled peach into contact with the other of said complementary discs so that the flesh of the peach is substantially completely severed prior to the splitting of the peach pit.

9. In a fruit splitter for splitting the flesh and pit of a clingstone peach, the combination of a pair of discs, means for rotating the discs toward each other, the discs being mounted in edge overlapping shearing relation, a notch formed in one of said discs into which notch the pit of the fruit is positioned as the fruit is impaled on said disc, the edges of said discs being sharpened by beveling away from their points of contact, and the advanced edge of the disc within the notch being turned outwardly from the edge of the other disc, and the sharpened edges of the notch overlapping with reference to the other of said discs in shearing relation.

10. In a fruit splitter for splitting apart clingstone peaches, including the flesh of the peach and the pit thereof, a pair of splitting discs, a pair of shafts upon which the discs are mounted in edge overlapping shearing relation, means for driving the shafts to rotate the discs toward each other, an impaling notch in one of said discs in which the pit of the fruit is adapted to pass on impaling the fruit on said disc, a portion of the edge of the notch being sharpened and lying in overlapping shearing relation with reference to the other disc, and the advanced edge of the said disc at said notch being turned away from the edge of the other disc.

11. In a fruit splitter, the combination including a splitting disc having a plurality of pit receiving notches formed from its periphery, the edge of the disc in the notch being beveled to a sharpened edge, and the advanced edge of the disc within the notch being turned outwardly opposite to the direction of the sharpened bevel.

12. In a fruit splitter, a pair of splitting discs having matching notches formed from their peripheries, means for mounting the discs in edge overlapping relation, means for rotating the discs toward each other in timed relation, and means for adjusting one of said discs to vary the degree of edge overlapping of said discs.

13. In a fruit splitter, a splitting disc having a plurality of pit receiving notches formed inwardly from its periphery, the periphery of the disc being beveled to a sharpened edge, the edge of the disc within the notch being beveled to a sharpened edge, and a portion of the sharpened edge of the disc adjacent the notch being turned outwardly opposite to the direction of the sharpening bevel.

14. In a fruit splitter, a pair of splitting discs having matching notches formed inwardly from their periphery, means for mounting the discs in edge overlapping relation, means for rotating the discs toward each other in timed relation, the edges of the discs within the notches being beveled to sharpen the edges, and the meeting advanced edges of the discs being turned away from each other to avoid overlapping of the discs during their rotation.

15. In a fruit splitter, a splitting disc having a pit receiving notch formed inwardly from its periphery, and the disc at the base of said notch being provided with a hardened steel sharpened insert.

ALBERT R. THOMPSON.